US007891332B2

(12) United States Patent
Shin et al.

(10) Patent No.: US 7,891,332 B2
(45) Date of Patent: Feb. 22, 2011

(54) METHOD AND APPARATUS FOR GENERATING CRANKSHAFT SYNCHRONIZED SINE WAVE

(75) Inventors: Kwang-Keun Shin, Rochester Hills, MI (US); David J. Verbrugge, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1183 days.

(21) Appl. No.: 11/535,525

(22) Filed: Sep. 27, 2006

(65) Prior Publication Data

US 2008/0083395 A1 Apr. 10, 2008

(51) Int. Cl.
*F02B 75/06* (2006.01)
*G01L 3/00* (2006.01)

(52) U.S. Cl. .................. 123/192.1; 73/114.25; 701/111

(58) Field of Classification Search ............. 123/192.1, 123/192.2; 73/114.04, 114.25; 701/101, 701/111

See application file for complete search history.

(56) References Cited

U.S. PATENT DOCUMENTS 6,138,629 A * 10/2000 Masberg et al. .......... 123/192.1
6,459,970 B2 * 10/2002 Goto et al. .................... 701/99
7,025,342 B2 * 4/2006 Nemoto et al. ......... 267/140.14

* cited by examiner

*Primary Examiner*—Noah Kamen
(74) *Attorney, Agent, or Firm*—Quinn Law Group, PLLC

(57) ABSTRACT

A method of generating a crankshaft synchronized sine wave signal for an internal combustion engine is provided. The method includes the steps of: A) sensing an observed crankshaft angle of the crankshaft; B) using a dynamic observer to generate an estimated crankshaft angle from said observed crankshaft angle; and C) generating the crankshaft synchronized sine wave signal as a function of the estimated crankshaft angle. The crankshaft synchronized sine wave signal is preferable output to at least one of an active vibration control system and an active noise control system. An apparatus for generating a crankshaft synchronized sine wave for an internal combustion engine according to the method of the present invention is also disclosed.

20 Claims, 3 Drawing Sheets

METHOD AND APPARATUS FOR GENERATING CRANKSHAFT SYNCHRONIZED SINE WAVE

TECHNICAL FIELD

The present invention relates to a method and apparatus for generating a crankshaft synchronized sine wave for use with active noise and vibration control systems in conjunction with internal combustion engines.

BACKGROUND OF THE INVENTION

Active noise control and active vibration control systems are employed to reduce noise and vibrations induced by internal combustion engines of vehicles. Active noise control systems utilize speakers and microphones to cancel sound emitted from the engine, which has a frequency that is synchronized with the rotational speed of the crankshaft. Active vibration control systems utilize active actuators, such as active engine mounts, to cancel engine induced vibrations, which also have a frequency synchronized with the rotational speed of the crankshaft. Therefore, the effectiveness of an active noise control and active vibration control system depends on an accurate crank angle signal.

Many modern engines have a crankshaft position sensor operable to provide a crank pulse indicating crank angle. The crank pulse usually lacks the resolution sufficient for active noise and vibration control. Therefore, the crank pulse must be processed or conditioned to generate precise crank angle values for use with active noise and vibration control systems.

Some engine manufacturers have developed AFM (Active Fuel Management, formerly called Displacement on Demand) systems to improve the fuel economy of internal combustion engines. An AFM engine operates in a normal mode (all cylinders are turned on) when power above a predetermined threshold is required and in an AFM mode (half of the cylinders are turned off) when power requirement is reduced. To generate the same level of driving torque with a reduced number of active cylinders, AFM mode produces a higher level of firing force, as a result of increased in-cylinder pressures, for each active cylinder. This higher firing force induces higher torque variations, which produce higher level of structural vibrations degrading noise and vibration, or N&V, performance. In addition, the AFM mode firing frequency reduces to half of the normal mode firing frequency, resulting in more excitation to structurally sensitive frequency ranges. Therefore, conventional passive approaches of vibration suppression may not meet the N&V requirement for both AFM mode and normal mode of engine operation. Engine induced N&V issues also arise in engines with high torque pulses including diesel and homogeneous charge compression ignition, or HCCI, engines. One possible solution to suppress the engine induced vibration is to apply active vibration control technology using smart actuators such as active engine mounts.

There are several types of semi-active and active actuators that can be used for engine vibration suppression. An example of a semi-active actuator is a switchable engine mount whose damping characteristic may be electronically switched between soft and stiff by using electro-hydraulic or magneto rheological (MR) technology. With semi-active actuators, the vibration sensitivity may be switched as operating frequency changes, but may not completely cancel the engine vibration. Active actuators, on the other hand, produce force and/or displacement to counteract engine induced vibration. One type of active actuator is the Active Tuned Absorber (ATA), which utilizes inertial force within the actuator. Another type of active actuator is the Active Engine Mount (AEM). The AEM can generate displacement to counteract engine vibration and at the same time support the static load of the engine.

SUMMARY OF THE INVENTION

A method of generating a crankshaft synchronized sine wave signal for an internal combustion engine is provided. The method includes the steps of: A) sensing an observed crankshaft angle of the crankshaft; B) using a dynamic observer to generate an estimated crankshaft angle from the observed crankshaft angle; and C) generating the crankshaft synchronized sine wave signal as a function of the estimated crankshaft angle.

The method may further include the step of communicating the crankshaft synchronized sine wave signal to at least one of an active noise control system and an active vibration control system. The method may also include generating an estimated crankshaft rotational frequency using the dynamic observer. The crankshaft synchronized sine wave signal may be generated by determining at least one of the sine and cosine of the estimated crankshaft angle multiplied by an order value, while the frequency of the crankshaft synchronized sine wave signal may be generated by multiplying the estimated crankshaft rotational frequency by an order value.

An apparatus for generating a crankshaft synchronized sine wave for an internal combustion engine, having a crankshaft rotatably disposed therein, is also provided. The apparatus includes a sensor operable to sense the angular position of the crankshaft and communicate an observed crankshaft angle value and a controller operable to receive the observed crankshaft angle value. A dynamic observer is provided in communication with the controller and is sufficiently configured to generate an estimated crankshaft angle from the observed crankshaft angle value. The controller is preferably configured to determine the crankshaft synchronized sine wave as a function of the estimated crankshaft angle, and to communicate the crankshaft synchronized sine wave to at least one of an active vibration control system and an active noise control system.

The dynamic observer may include at least one integrator module operable to generate at least one of an estimated crankshaft speed and the estimated crankshaft angle. Further, the dynamic observer may include a revolution pulse generation module operable to reset the estimated crankshaft angle once per revolution of the crankshaft. In one embodiment, the dynamic observer may be configured to determine an error value by subtracting the estimated crankshaft angle from the observed crankshaft angle. In this embodiment the dynamic observer may include a quantization module operable to quantize the estimated crankshaft angle prior to subtracting the estimated crankshaft angle from the observed crankshaft angle and a dead band operator module operable to account for a predetermined amount of error in the error value.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
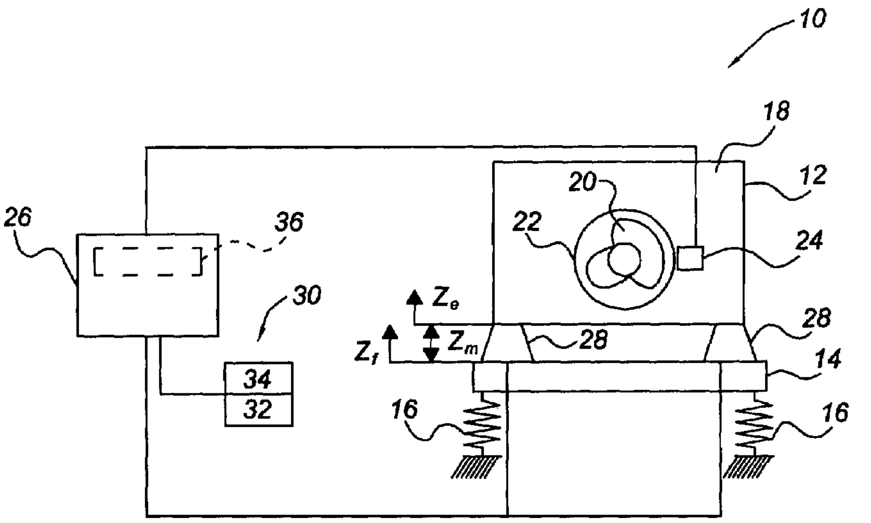
FIG. 1 is a schematic illustration of an engine incorporating a controller having a dynamic observer operable to provide control signals to an active engine mount system and an active noise cancellation system.

Referring to FIG. 1, there is shown a portion of a vehicle 10 having an internal combustion engine 12 mounted to a frame member 14. The frame member 14 is supported by a suspension system 16. Those skilled in the art will recognize that the suspension system 16 may include such components as springs, shock absorbers, tires, etc., which are not shown for purposes of clarity. The internal combustion engine includes an engine block 18 configured to rotatably support a crankshaft 20. The crankshaft 20 has a target wheel 22 mounted thereon for unitary rotation therewith. A sensor 24 is located substantially adjacent to the target wheel 22, and operates to provide an observed crankshaft angle value to a controller 26.

In the preferred embodiment, the internal combustion engine 12 will be a variable displacement engine, or operate in an active fuel management (AFM) mode of operation. Those skilled in the art will recognize that an AFM mode of operation refers to the disabling of half of the cylinders, not shown, of the internal combustion engine 12 during operating modes where the required power of the internal combustion engine 12 is operating below a predetermined value. That is, an internal combustion engine 12 having eight cylinders may disable four of the cylinders when the vehicle 10 is operating in a low engine load requirement mode of operation, such as a steady state highway driving schedule. Similarly, a six cylinder internal combustion engine 12 may disable three of the cylinders when the vehicle 10 is operating in a low engine load requirement mode of operation.

The internal combustion engine 12 is supported on the frame member 14 by an active vibration control system, such as active engine mounts 28. The active engine mounts 28 operate to cancel the vibrations imparted to the frame member 14 by the internal combustion engine 12. The controller 26 operates to provide a control signal to the active engine mounts 28. An active noise control system 30 receives control signals from the controller 26 and operates to cancel objectionable sound emitted from the internal combustion engine 12. The active noise control system includes a microphone 32, for sensing sound and communicating the sound signal to the controller 26 for processing, and a speaker 34, for outputting the waveform operable to cancel the sound emitted from the internal combustion engine 12. The controller 26 includes a dynamic observer 36 operable to process or condition the crankshaft angle signal provided to the controller 26 by the sensor 24 for subsequent communication to the active engine mounts 28 and the active noise control system 30. The construction and operation of the dynamic observer 36 will be discussed in greater detail hereinbelow.

Engine induced vibrations are synchronized with engine cycle and hence with crankshaft angle. For example, the active fuel management mode of a V6 internal combustion engine generates a vibration whose frequency is 1.5 times faster than crankshaft revolution frequency. Since the crankshaft frequency changes and the engine vibration is a function of crankshaft angle, it is more convenient to use order instead of frequency. Frequency is the number of oscillations per second, while order is the number of oscillations per one crankshaft revolution. Therefore, the active fuel management mode of a V6 engine has $1.5^{th}$ order vibration. Similarly, the active fuel management mode of a V8 engine has $2^{nd}$ order vibration.

The main idea of vibration suppression using active engine mounts 28 is to generate a counter vibration to cancel the vibration produced by the internal combustion engine 12. Since the vibration of the internal combustion engine is synchronized with the angel of the crankshaft 20, the counter vibration also should be synchronized with the crankshaft angle. The engine generates $p^{th}$ order displacement $z_e=\alpha_o \cos(p\theta)+\beta_o \sin(p\theta)$, where the magnitude and phase are determined by the unknown parameters $\alpha_o$ and $\beta_o$. Driven by the controller 26, the active engine mounts 28 generates $p^{th}$ order displacement $z_m=\alpha(p\theta)+\beta(p\theta)$, where the magnitude and phase are determined by the control parameters $\alpha$ and $\beta$. The control objective is to cancel $p^{th}$ order displacement $z_f=z_e-z_m$ of the frame member 14. The ideal control parameters are $\alpha=\alpha_o$ and $\beta=\beta_o$. However, the parameters $\alpha_o$ and $\beta_o$ are unknown and the control algorithm is designed to find parameters $\alpha_o$ and $\beta_o$. Therefore, the control algorithm needs order reference sine and cosine from the crankshaft angle.

To implement the control algorithm, unit cosine and sine synchronized with order multiple of crankshaft revolution is required. To obtain the order reference, the crankshaft angle must be measured in real time. Many currently produced internal combustion engines 12 provide a crankshaft pulse every six degrees of crankshaft angle, thereby providing sixty pulses per crankshaft revolution. However, typically there are two missing pulses every revolution indicating starting angle; consequently, there are only fifty eight pulses per crankshaft revolution, not sixty. The period of fifty eight teeth starting from any pulse is equal to one crankshaft revolution period. Once the crankshaft angle is determined, the order reference cosine and sine may be generated. Having order references, the control parameters $\alpha$ and $\beta$ can be determined either by closed-loop control or by open-loop control.

The frequencies of the firing induced vibrations of the internal combustion engine 12 are order multiples of crankshaft revolution. As stated hereinabove, order is defined as the number of oscillations per one crankshaft revolution, while the frequency is number of oscillations per second. Since the rotational speed of the crankshaft 20 (engine rpm) changes during operation, it is more convenient to use order as the frequency reference rather than absolute frequency. For example, the primary vibration frequency of a V6 engine is $3^{rd}$ order, which means the frequency is exactly three times the crankshaft revolution frequency. For a V6 engine operating in an active fuel management mode of operation with one bank of three cylinders disabled, the primary vibration frequency is $1.5^{th}$ order. Similarly, for a V8 engine, the primary vibration frequency is $4^{th}$ order and the primary vibration frequency of a V8 engine operating in an active fuel management mode of operation, having four cylinders disabled, is $2^{nd}$ order.

In addition to the order, the phase of the vibration is fixed relative to the crankshaft angle because the firing events occur based on the 0-720 degree engine phase, based on a four-stroke mode of engine operation, which constitutes two revolutions of the crankshaft 20. Considering the order and the phase together, the firing induced vibration is synchronized with the crankshaft revolution.

The purpose of the control algorithm is to cancel fixed order vibration. Therefore, the control algorithm relies on order references that are unit cosine and unit sine signals of target order with fixed phase relative to the crankshaft angle. Once, the order reference is synchronized with the crankshaft 20, the control algorithm finds magnitude and phase of the movements of the active engine mounts 28 relative to the order reference, so that the active engine mounts 28 can cancel vibration induced by the internal combustion engine. For this reason, the synchronization of order reference to engine phase is important to the control of the active engine mounts 28.

Figure 2:
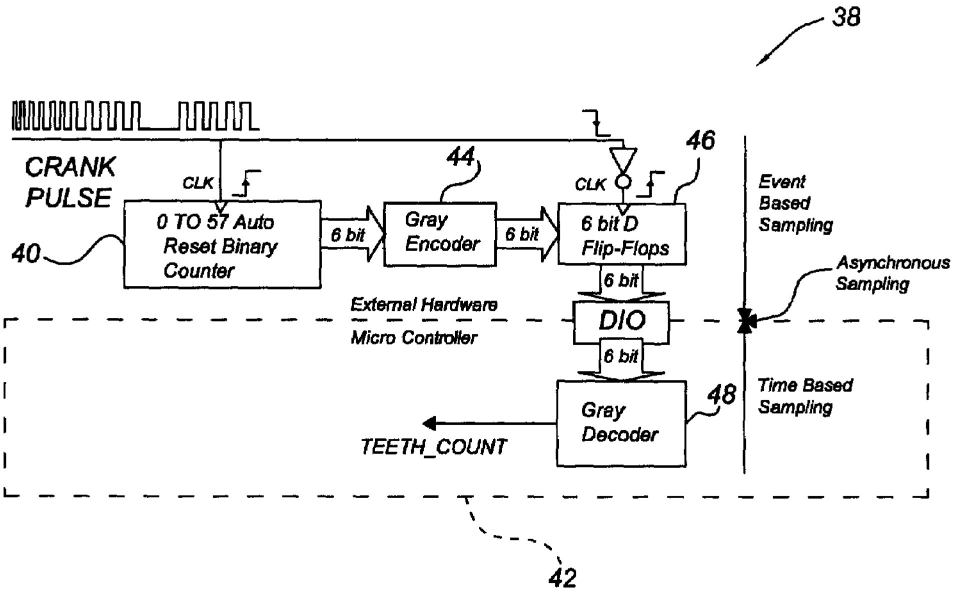
FIG. 2 is a schematic illustration of a crankshaft pulse counter.

Referring to FIG. 2, and with continued reference to FIG. 1, a crankshaft pulse counter 38 is schematically illustrated. The observed angle of the crankshaft 20 can be measured by counting fifty eight crankshaft pulses. This can be done by using a counter 40. The counter 40 is preferably operable to count the crankshaft pulses and reset itself when the counter value reaches fifty eight. The output of the counter is a six bit binary number indicating the angle of the crankshaft 20. However, the starting angle is not deterministic because the counter 40 begins when it is powered asynchronous to other events. A micro-controller 42 reads the six bit binary number with a fixed sampling rate; however, the counter value is updated based on the crankshaft pulse event. The micro-controller 42 may be incorporated within the controller 26 or may be separate. The discrepancy of the crankshaft pulse event and the fixed sampling rate of the micro-controller 42 results in an asynchronous data transfer issue. A gray code encoder 44 and D flip-flops 46 are added to resolve the asynchronous data transfer issue between the counter hardware and the micro-controller 42. After the counter value is fetched to the controller 26, a gray code decoder 48 restores the original value of the counter 40.

Figure 3:
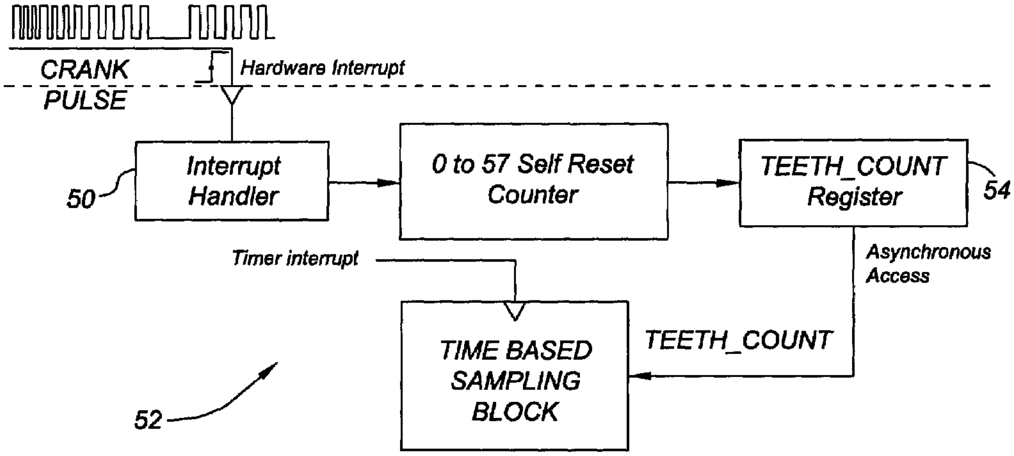
FIG. 3 is a schematic illustration of a software implementation of a crankshaft pulse counter.

Referring to FIG. 3, and with continued reference to FIG. 1, a software implementation of a crankshaft pulse counter is schematically illustrated. An alternative way of implementing the crankshaft pulse counter is to use a hardware interrupt 50, which is provided by most micro controllers. FIG. 3 shows a schematic of an interrupt driven crankshaft pulse counter 52. In this case, there is no need to use external counter hardware. Instead, the crankshaft pulse is directly connected to the hardware interrupt 50 to trigger the interrupt routine. The interrupt routine increases the counter value every time it is triggered. If the counter value reaches fifty eight, the interrupt routine resets the count value to zero. The counter value is stored in a register 54 so that the time based sampling routine can access the data.

The entire control algorithm, except the crankshaft pulse interrupt routine, is driven by fixed sampling time. The time based sampling system reads the counter value once per sampling period. Because of the asynchronous sampling between counter update and counter value reading, the counter value reading of the fixed sampling system is very irregular although the actual counter value is regularly increased.

A simple way to calculate an estimated crankshaft angle from the count reading is:

$$\hat{\theta}(k) = \frac{2\pi}{58} y(k) \tag{1}$$

where $\hat{\theta}(k)$ and y(k) are estimated crankshaft angle and the count reading at $k^{th}$ sample, respectively. However, Equation (1) has two issues. First, the estimated crankshaft angle is not smooth and the cosine and sine generated from this angle is rough or irregular. Second, since the control algorithm does not detect the missing tooth of the target wheel 22 and the estimated crankshaft angle is one revolution average of the crankshaft angle, ignoring the missing pulses distorts the sinusoids and results in performance degradation of the control system, which depends on the reference sinusoid. These issues can be resolved by using the dynamic observer 36.

For a constant speed, the discrete-time domain kinematics model of crankshaft rotation is as follows:

$$\theta(k+1)=\theta(k)+2\pi f(k)/f_S, \tag{2}$$

$$f(k+1)=f(k). \tag{3}$$

where θ(k), f(k), $f_S$ are observed crankshaft angle, rotational frequency, and sampling frequency, respectively.

Two states may be defined as follows:

$$x_1(k)=N\theta(k)/2\pi \tag{4}$$

$$x_2(k)=Nf(k)/f_S \tag{5}$$

$$y(k)=x_1(k) \tag{6}$$

where the physical meaning of $y(k)=x_1(k)$ and $x_2(k)$ are the observed crankshaft angle in terms of the number of crankshaft pulses and crankshaft speed in terms of the number of crankshaft pulses per sampling time, respectively.

Equations (4), (5) and (6) are then written in state space form:

$$\begin{Bmatrix} x_1(k+1) \\ x_2(k+1) \end{Bmatrix} = \begin{bmatrix} 1 & 1 \\ 0 & 1 \end{bmatrix} \begin{Bmatrix} x_1(k) \\ x_2(k) \end{Bmatrix}, \quad y(k) = [1\ 0] \begin{Bmatrix} x_1(k) \\ x_2(k) \end{Bmatrix} \tag{7}$$

To track y(k) with an observer technique. The dynamic model of the dynamic observer 26 is then:

$$\begin{Bmatrix} \hat{x}_1(k+1) \\ \hat{x}_2(k+1) \end{Bmatrix} = \begin{bmatrix} 1 & 1 \\ 0 & 1 \end{bmatrix} \begin{Bmatrix} \hat{x}_1(k) \\ \hat{x}_2(k) \end{Bmatrix} + \begin{bmatrix} l_1 \\ l_2 \end{bmatrix} [y(k) - \hat{y}(k)], \quad \hat{y}(k) = [1\ 0] \begin{Bmatrix} \hat{x}_1(k) \\ \hat{x}_2(k) \end{Bmatrix} \tag{8}$$

The error dynamics can be obtained by substituting Equation (8) from Equation (7) to yield:

$$\begin{Bmatrix} \tilde{x}_1(k) \\ \tilde{x}_2(k) \end{Bmatrix} = \begin{bmatrix} 1-l_1 & 1 \\ -l_2 & 1 \end{bmatrix} \begin{Bmatrix} \tilde{x}_1(k-1) \\ \tilde{x}_2(k-1) \end{Bmatrix} \tag{9}$$

where $\tilde{x}_i(k)=x_i(k)-\hat{x}_i(k)$

The characteristic equation of the error dynamics (9) becomes:

$$z^2-(2-l_1)z+(1-l_1+l_2) \tag{10}$$

The observer parameter $l_1$ and $l_2$ can be designed as follows:

A) Construct a continuous time characteristic equation by choosing desired natural frequency $\omega_n$ and damping ratio ζ, i.e., $$s^2+2\zeta\omega_n s+\omega_n^2 \tag{11}$$

The damping ratio and the natural frequencies are tuning parameters for the dynamic observer 26.

B) Convert Equation (11) into discrete-time version to yield the corresponding discrete-time characteristic equation, i.e., $$z^2-az+b \tag{12}$$

C) Calculate $l_1$ and $l_2$ such that:

$$l_1=2-a \text{ and } l_2=b+1-a$$

An exemplary calculation of $l_1$ and $l_2$ is as follows:

Damping ratio: $\zeta=1$

Settling time:

$$t_s = \frac{4.6}{\zeta\omega_n} = 0.1(\text{sec}) \text{ yields } \omega_n = 46(\text{rad/sec})$$

Discrete sampling time: $T_S=0.0005$ (sec)

Discrete-time characteristic polynomial: $z^2-1.9545+0.955$

Observer parameters: $l_1=455.e-4$ and $l_2=5.e-4$

The basic structure of the dynamic observer 26 has the form of Equation (8). However, the practical implementation requires several treatments. First, the estimated count $\hat{y}(k)=\hat{x}_1(k)$, which corresponds to crankshaft angle, can increase without bound with time while the count reading y(k) is a repeating ramp of 0 to 57. To keep $\hat{x}_1(k)$ in range, the algorithm subtracts fifty eight counts from $\hat{x}_1(k)$, once every crankshaft revolution. The revolution pulse generation method is as follows:

```
Initialization:
                y_old = -1;
Inputs:
                y(k) : Count Reading
Algorithm:
                One_Rev_Flag = 0;
If (y(k) < 0.5*y_old) One_Rev_Flag = 1;
                y_old = y(k);
Outputs:
                One_Rev_Flag
```

As an example of the revolution pulse generation method outlined hereinabove, as the count reading value y(k) resets from fifty seven to one, (y(k)<0.5*y_old) becomes true since one is less than 0.5 multiplied by fifty seven. Therefore, the output One_Rev_Flag is set equal to one indicating one revolution of the crankshaft 20. Second, since the count reading y(k) is a quantized integer, the estimated count reading $\hat{y}(k)$ should be a quantized integer to compare the count reading and the count estimates. Third, the estimated count ranges from zero to fifty nine as if there is no missing tooth on the target wheel 22, while the count reading is zero to fifty seven with missing teeth on the target wheel. This will generate the output error of two even when the dynamic observer 36 is operating correctly.

Figure 4:
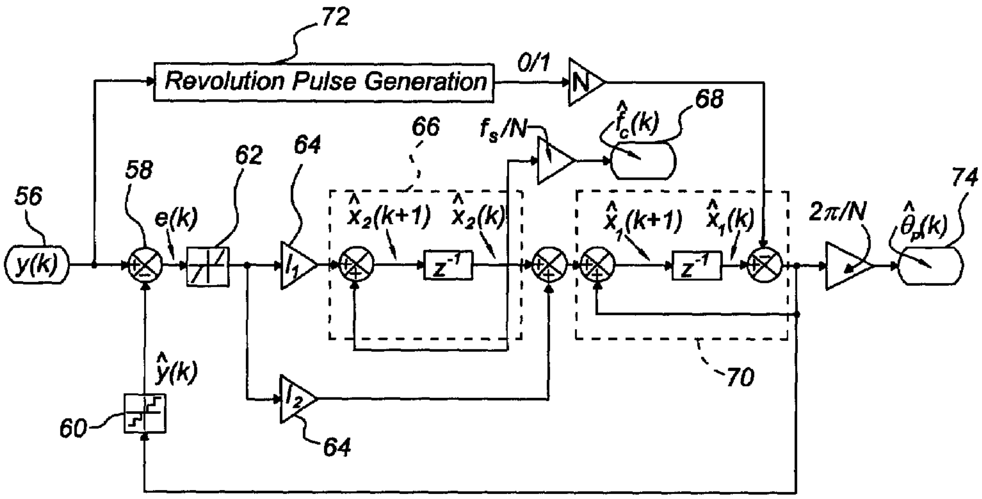
FIG. 4 is a schematic representation of the dynamic observer, shown in FIG. 1.

Referring now to FIG. 4, and with continued reference to FIG. 1, there is shown a schematic representation of the dynamic observer 36 of FIG. 1. At block 56 the count reading y(k) is read into the dynamic observer 36 from the sensor 24 of FIG. 1. Subsequently, the estimated count reading $\hat{y}(k)$ is subtracted from the count reading y(k), via the subtraction module 58, to determine an error count value e(k). As mentioned hereinabove, the count reading y(k) is a quantized integer; therefore, the estimated count reading $\hat{y}(k)$ should be a quantized integer to compare the count reading and the count estimates. A module 60 is provided for the quantization of discrete values of the estimated count reading $\hat{y}(k)$ into a stepwise function. The error count value e(k) is input to a dead band operator module 62 to account for missing teeth on the target wheel 22.

The output of the dead band operator module 62 is subject to gain modules 64. An integrator module 66 is operable to provide the estimated crankshaft rotational speed $\hat{x}_2(k)$ in terms of crankshaft pulses per sampling time. The estimated rotational frequency of the crankshaft $\hat{f}_c(k)$ is output from the integrator module 66 as indicated by block 68. The output of the integrator module 66 is input to an integrator module 70, which is operable to provide an estimated crankshaft angle $\hat{x}_1(k)$, the value of which is fed back to the quantization module 60 for determination of the error count value e(k). Further, a revolution pulse generation module 72 is provided to reset the estimated crankshaft angle $\hat{x}_1(k)$ every time the counter reading at block 56 resets to zero in accordance with the revolution pulse generation method described hereinabove. The output of the dynamic observer 36 is the estimated crank angle $\hat{\theta}(k)$, as illustrated by block 74. The estimated crankshaft angle $\hat{\theta}(k)$ is smooth and synchronized with the true or observed crankshaft angle θ(k), but with an unknown and constant phase delay.

The crankshaft reference cosine and sine of order p can be generated from the estimated crankshaft angle, i.e., $$\cos_p(k)=(p\hat{\theta}(k)) \tag{13}$$

$$\sin_p(k)=(p\hat{\theta}(k)) \tag{14}$$

Where $\cos_p(k)$ and $\sin_p(k)$ are $p^{th}$ order unit cosine and sine, respectively. Also the frequency of $p^{th}$ order reference $f_p$ is:

$$f_p=pf_c(k) \tag{15}$$

Figure 5:
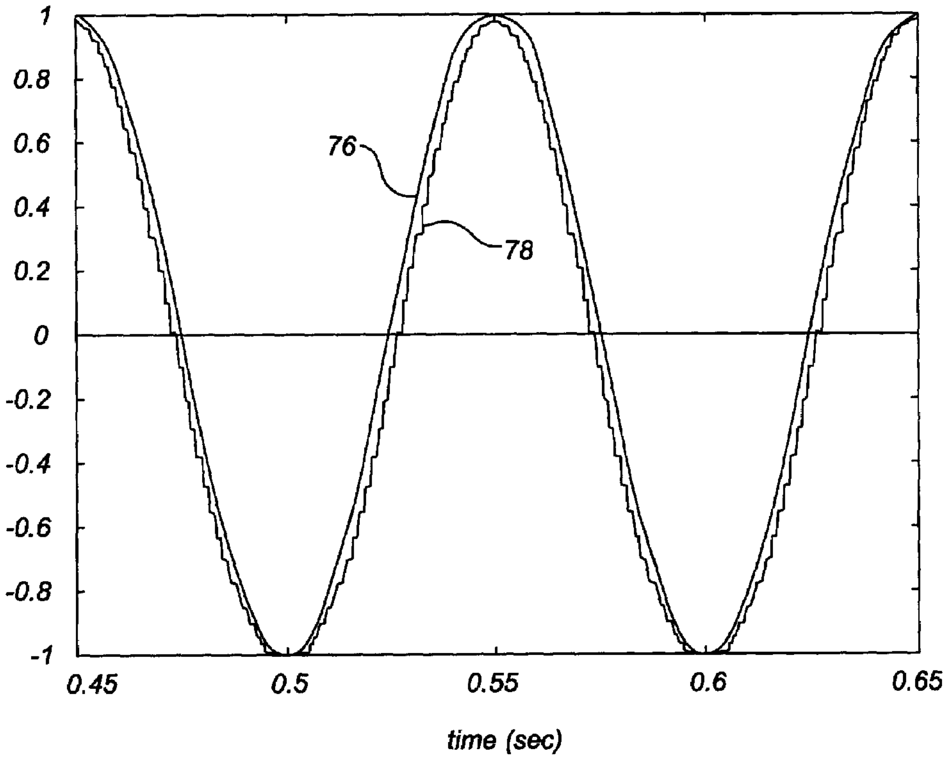
FIG. 5 is a graphical illustration of a first order reference cosine of an engine operating at 600 RPM illustrating a control system with and without a dynamic observer.

FIG. 5 shows the comparison of the first order reference cosine with, illustrated by line 76, and without, illustrated by line 78, the dynamic observer 36. As shown in FIG. 5, the dynamic observer 36 discussed hereinabove compensates for the missing teeth of the target wheel 22 and smoothes the roughness of the crankshaft pulse signal due to asynchronous sampling. Similarly, a $p^{th}$ order reference cosine and sine can be generated from the estimated crankshaft angle $\hat{\theta}(k)$ by multiplying p by the estimated crankshaft angle $\hat{\theta}(k)$ and taking cosine and sine thereof.

The present invention enables generation of crankshaft synchronized reference order sinusoid for use in control systems such as the active engine mounts 28. The present invention resolves the issue of data transition between event based sampling of crankshaft pulse count and time based sampling of active vibration and noise control system. The method also smoothes the estimated crankshaft angle by using the observer technique to generate a smooth and precise reference sinusoid in a time based sampling system. Finally, the estimated crankshaft angle $\hat{\theta}(k)$ does not detect the initial crankshaft position and hence includes an unknown, but constant, angle offset from the actual crankshaft angle. However, the unknown angle offset does not affect the control system since the control algorithm automatically compensates for the unknown offset. Although the forgoing discussion relates generally to a target wheel 22 having fifty eight pulses per revolution of the crankshaft 20, those skilled in the art will recognize that the present invention may be used with target wheels having an alternate number of pulses per revolution of the crankshaft while remaining within the scope of that which is claimed.

While the best modes for carrying out the invention have been described in detail, those familiar with the art to which this invention relates will recognize various alternative designs and embodiments for practicing the invention within the scope of the appended claims.

The invention claimed is:

1. A method of generating a crankshaft synchronized sine wave signal for an internal combustion engine, the method comprising:

sensing an observed crankshaft angle of the crankshaft;

using a dynamic observer to generate an estimated crankshaft angle from said observed crankshaft angle; and generating the crankshaft synchronized sine wave signal as a function of said estimated crankshaft angle.

2. The method of claim 1, further comprising communicating the crankshaft synchronized sine wave signal to an active noise control system.

3. The method of claim 1, further comprising communicating the crankshaft synchronized sine wave signal to an active vibration control system.

4. The method of claim 1, further comprising generating an estimated crankshaft rotational frequency using said dynamic observer.

5. The method of claim 4, further comprising generating a frequency of the crankshaft synchronized sine wave signal by multiplying said estimated crankshaft rotational frequency by an order value.

6. The method of claim 1, generating a crankshaft synchronized sine wave signal by determining at least one of the sine and cosine of said estimated crankshaft angle multiplied by an order value.

7. The method of claim 1, further comprising resetting said estimated crankshaft angle once every rotation of the crankshaft.

8. The method of claim 1, further comprising determining an error by subtracting said estimated crankshaft angle from said observed crankshaft angle.

9. The method of claim 8, further comprising quantizing said estimated crankshaft angle prior to subtracting said estimated crankshaft angle from said observed crankshaft angle.

10. The method of claim 8, further comprising subjecting said error to a dead band operator to account for a predetermined amount of error.

11. An apparatus for generating a crankshaft synchronized sine wave for an internal combustion engine having a crankshaft rotatably disposed therein, the apparatus comprising:

a sensor operable to sense the angular position of the crankshaft and communicate an observed crankshaft angle value;

a controller operable to receive said observed crankshaft angle value;

a dynamic observer in communication with said controller and sufficiently configured to generate an estimated crankshaft angle from said observed crankshaft angle value; and wherein said controller is configured to generate the crankshaft synchronized sine wave as a function of said estimated crankshaft angle.

12. The apparatus of claim 11, wherein said dynamic observer includes a integrator module operable to generate an estimated crankshaft speed.

13. The apparatus of claim 11, wherein said dynamic observer includes a integrator module operable to generate said estimated crankshaft angle.

14. The apparatus of claim 11, wherein said dynamic observer includes a revolution pulse generation module operable to reset said estimated crankshaft angle once per revolution of the crankshaft.

15. The apparatus of claim 11, wherein said dynamic observer is sufficiently configured to generate an estimated crankshaft rotational frequency from said observed crankshaft angle value.

16. The apparatus of claim 11, wherein said controller is configured to communicate the crankshaft synchronized sine wave to at least one of an active vibration control system and an active noise control system.

17. An apparatus for generating a crankshaft synchronized sine wave for an internal combustion engine having a crankshaft rotatably disposed therein, the apparatus comprising:

a sensor operable to sense the angular position of the crankshaft and communicate an observed crankshaft angle value;

a controller operable to receive said observed crankshaft angle value;

a dynamic observer in communication with said controller and sufficiently configured to generate an estimated crankshaft angle from said observed crankshaft angle value; and wherein said controller is configured to generate the crankshaft synchronized sine wave as a function of said estimated crankshaft angle, said controller being sufficiently configured to communicate the crankshaft synchronized sine wave to at least one of an active vibration control system and an active noise control system.

18. The apparatus of claim 17, wherein said dynamic observer includes at least one integrator module operable to generate at least one of an estimated crankshaft speed and said estimated crankshaft angle.

19. The apparatus of claim 17, wherein said dynamic observer includes a revolution pulse generation module operable to reset said estimated crankshaft angle once per revolution of the crankshaft.

20. The apparatus of claim 17, wherein said dynamic observer is further configured to determine an error value by subtracting said estimated crankshaft angle from said observed crankshaft angle and wherein said dynamic observer includes:

a quantization module operable to quantize said estimated crankshaft angle prior to subtracting said estimated crankshaft angle from said observed crankshaft angle; and a dead band operator module operable to account for a predetermined amount of error in said error value.

* * * * *